United States Patent [19]

Lawless

[11] Patent Number: 4,986,126

[45] Date of Patent: Jan. 22, 1991

[54] TRANSDUCER WITH HEAT SINK

[75] Inventor: Daniel F. Lawless, Hazel Green, Ala.

[73] Assignee: Acustar, Inc., Troy, Mich.

[21] Appl. No.: 498,526

[22] Filed: Mar. 26, 1990

[51] Int. Cl.⁵ .............................................. G01L 19/04
[52] U.S. Cl. ........................................ 73/708; 73/115; 73/756; 73/431
[58] Field of Search ................. 73/708, 725, 746, 733, 73/717, 431, 154, 756, 721, 720, 724, 726, 727, 115, DIG. 4, 706, 431

[56] References Cited

U.S. PATENT DOCUMENTS

| | | | |
|---|---|---|---|
| 3,614,487 | 10/1971 | Hatschek | 310/346 |
| 3,673,443 | 6/1972 | Slegel | 310/8.7 |
| 4,271,701 | 6/1981 | Dempste et al. | 73/717 |
| 4,587,595 | 5/1986 | Staples | 361/388 |
| 4,713,729 | 12/1987 | Elermann | 361/386 |
| 4,796,464 | 1/1989 | Miller | 73/115 |
| 4,809,555 | 5/1989 | Kunz | 73/727 |
| 4,866,989 | 9/1989 | Lawless | 73/756 |

Primary Examiner—Donald O. Woodiel
Attorney, Agent, or Firm—Kenneth H. MacLean, Jr.

[57] ABSTRACT

An improved electronic oil pressure transducer with a circuit board supporting a power transistor and with a metal heat sink attached to the transducer so that a portion thereof extends through an aperture in the transducer housing and into intimate contact with the power transistor to transfer heat from the transistor to the atmosphere.

8 Claims, 1 Drawing Sheet

U.S. Patent   Jan. 22, 1991   4,986,126
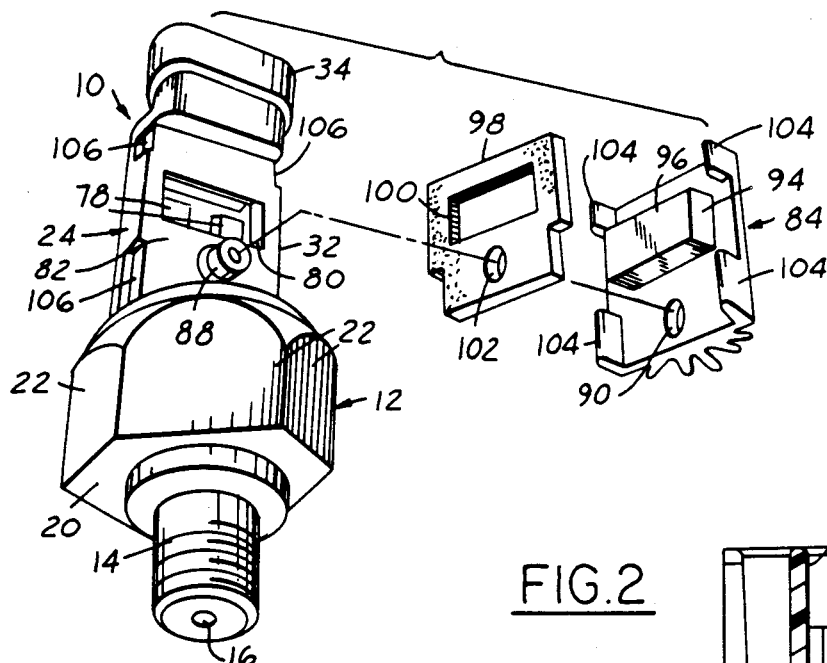
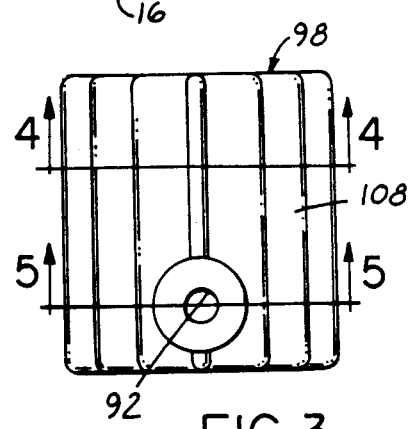
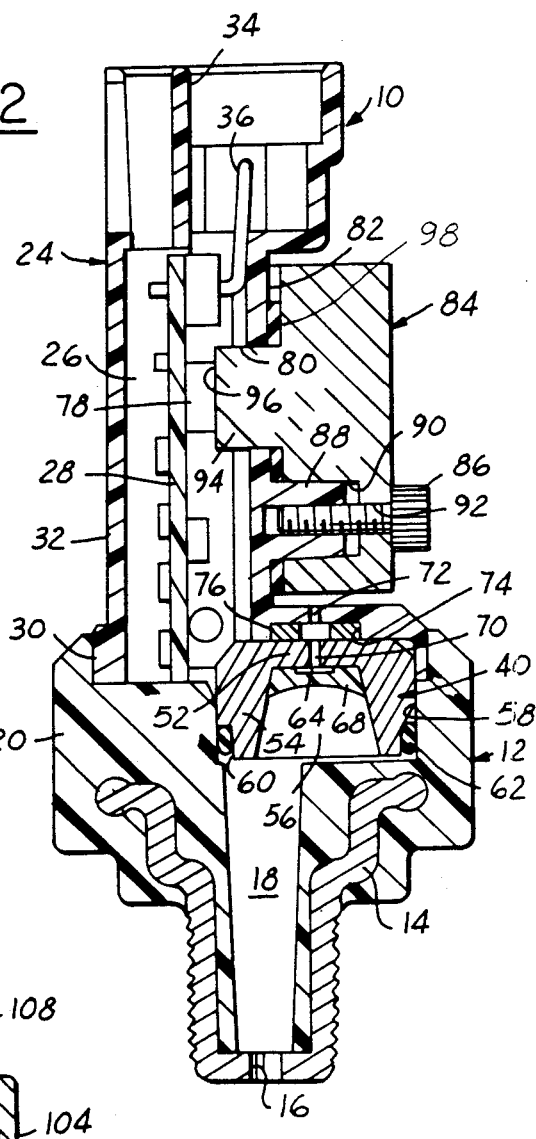

TRANSDUCER WITH HEAT SINK

BACKGROUND OF THE INVENTION

1. Field of the Invention

This application concerns an improved pressure transducer useful to determine oil pressure in an automobile engine and more particularly such a transducer with a housing containing a power transistor and supporting an external heat sink which has a portion in intimate contact with the power transistor to transfer heat generated by the transistor to atmosphere.

2. Description of Related Art

Previously, automakers have utilized electronics to determine fluid pressures such as the oil pressure in an engine. An example of such a device is found in U.S. Pat. No. 4,866,989 to Lawless and assigned to Chrysler. In this device a chip is exposed on one side to atmosphere and on the other side to pressurized oil. The resultant stress on the chip produces a small electric signal. A circuit board in the transducer housing processes the signal and outputs a low electrical signal. This low signal is not of sufficient value to operate a warning light or power an oil pressure gage. In automobiles using the above described transducer, the low signal must be further processed and amplified to be useful. This processing is carried out at a remote location in the automobile. It would be desirable to have a pressure transducer with a sufficient output to directly power warning or indicating devices.

SUMMARY OF THE INVENTION

It would be desirable to have a pressure transducer similar to the previously described device but one capable of generating a sufficient electrical output capable of directly powering a warning light or a gage. Unfortunately, to generate such a large electrical output, at least one power device such as a MOSFET transistor needs to be added to the circuit board. The resultant enclosure of a power device in a transducer housing and within a hot engine compartment produce sufficient heat to destroy the power device.

This patent application concerns an improved fluid pressure transducer of the electronic type previously described and the subject of the Lawless patent. However, power devices are included on the circuit board to produce a sufficient electrical output to operate warning lights or gages. To prevent heat build-up and resultant destruction of the power devices, a heat sink is attached to the exterior of the transducer. A portion of the heat sink projects through a window in the transducer housing so that a surface of the heat sink intimately engages a surface of the power device, producing a good heat transfer contact. In this manner, heat is transferred from the power device to atmosphere.

Therefore, the primary object of this invention is to provide an improved electronic fluid pressure transducer with a heat sink for an internal power device which generates a sufficient electrical output for directly operating an indicating gage or a light indicator for the vehicle operator.

Other objects and advantages of the subject power transducer will be more readily apparent after a reading of the following detailed description of a preferred embodiment, reference being had to the drawings which illustrate a preferred embodiment.

IN THE DRAWING

FIG. 1 is a perspective and partially exploded view of the transducer with a heat sink; and FIG. 2 is an elevational sectioned view of the assembled transducer; and FIG. 3 is an elevational sectioned view of the heat sink component of the transducer; and FIG. 4 is a sectioned view of the heat sink taken along section line 4—4 in FIG. 3 and looking in the direction of the arrows; and FIG. 5 is a sectioned view of the heat sink taken along section line 5—5 in FIG. 3 and looking in the direction of the arrows.

DETAILED DESCRIPTION OF A PREFERRED EMBODIMENT

In FIGS. 1 and 2, an electronic pressure transducer 10 for sensing and determining the pressure of fluid such as engine lubricating oil is illustrated. The transducer 10 has both sensor means to detect oil pressure and circuit means to determine the oil pressure by a characteristic electrical output. As shown in the drawings, the transducer 10 includes a base member 12 defining an enclosure. The base member 12 is composed of two main parts. The first part is a generally cup-shaped metal insert member 14 with an externally threaded hollow end portion. The end portion has an opening 16 therethrough. Opening 16 admits pressurized oil into the interior space 18 of the base member 12. Member 14 is partially enclosed or is encapsulated by a molded elastomeric outer portion 20. As best shown in FIGS. 1 and 2, the outer portion 20 has wrench engagable flats 22 so that the transducer 10 and the threaded end portion thereof can be readily rotated relative to a similarly threaded aperture in an associated vehicle engine (not shown).

The second part of the transducer 10 includes a thin walled and generally hollow housing member 24 which is attached to and supported by the base member 12. Housing 24 is molded of elastomeric plastic material and defines an interior space 26 in which a circuit board 28 is supported. The housing 24 has an annularly shaped lower end or base portion 30, a smaller midportion 32 which extends outwardly and is offset from the base portion 30 and a receptacle portion 34 to receive an electrical connector (not shown). As best understood by examining FIG. 2, the circuit board 28 has terminals 36 (only one visible) which extend from the upper edge of the board 28 into the receptacle portion 34. The circuit board 28 is connected by leads (not visible) extending from its lower edge to a sensor mounting member 40. The member 40 is molded of flexible rubber-like material such as Valox 420 which is resistant to oil or the like. For more details of the specific structure of the mounting member 40 and the connection between the circuit board 28 and mount 40, reference is made to the previously mentioned U.S. Pat. No. 4,866,989.

As shown in FIG. 2, the mounting member 40 has an inverted cup-shaped configuration. The mount 40 includes an upper end wall portion 52 and an integral side wall portion 54. Assembled with the portion 20 of base member 12, the mount defines interior space 56 which is communicated with the interior passage 18 and thus to the aperture 16. The side wall 54 of the mount 40 is inserted into a cylindrical recess 58 formed by portion 20. An annular channel 60 which is mold formed in the mount 40 houses an O-ring 62 to prevent oil leakage.

The mount 40 supports a generally flat electronic device or chip 64 which is secured against the underside of end wall 52 by silicone sealant. The chip 64 and the silicone sealant is completely covered with a relatively thick layer 68 of non-hardening sealant gel. At the upper side or surface of the chip 64, a small opening 70 is provided through the end wall 52. A second opening 72 is provided in the base portion 30 and is aligned with the first opening 70 to communicate the upperside of the chip 64 with the atmosphere and particularly atmospheric pressure. Also, an enlarged recess 74 in portion 30 is provided to receive a small O-ring 76. O-ring 76 contacts the chip 64 to prevent passage of any contaminants.

The passages 70, 72 permit the chip 64 to sense the pressure differential between the atmosphere and the oil in space 56. A force produced by oil pressure is communicated against the chip 64 through the non-hardening silicone gel 68. Resultantly, chip 64 generates a small variable electrical output which is proportional to the oil pressure. As previously explained, the electrical leads from the chip 64 to the circuit board 28 extend through and are molded within the mount 40. This electrically signal is reeved by components of the circuit board 28. The range of generated voltages produced by the differential pressure force on the chip 64 is in a low range insufficient to power a "low oil pressure" warning light or an oil pressure gage. For directly powering these devices, the output voltages must be increased considerably. Previously, this increase was achieved by components located externally of the transducer. This is necessary because the electronic power devices (power transistors) produce much heat. By mounting them on the circuit board within the transducer and in a hot engine compartment, the temperatures which the active portions of the transistors experienced is too great for them to last.

The subject power transducer 10 utilizes heat sink means to enable electronic power devices to be mounted on the circuit board 28 within the housing 24 of the transducer 10. Specifically, one or more power devices 78 are used as can be seen in FIG. 1. In the illustrated embodiment, two MOSFET type transistors 78 are mounted on the circuit board 28. Specific power transistors which have been successfully tested are the Phillips M-8849 (BUK 456) and the Motorola M-908 MTD 3055E. Both are power type transistors which in the transducer typically generate 130 watts or more. While operating at this high output, the devices 78 generate considerable heat.

As shown in FIGS. 1 and 2, the midportion 32 of upper housing 24 is formed with a generally rectangular window or opening 80 therethrough. The window 80 opens through a substantially flat wall portion 82 of the midportion 32 and is generally aligned with the power transistors 78 on the circuit board 28. A metal heat sink member 84 is shaped to generally overlie the flat surface 82 of midportion 32. A threaded fastener 86 attaches the heat sink 84 to the midportion 32. Specifically, fastener 86 is threadably secured into an enlarged boss 88 formed on and projecting from the midportion 32. The heat sink has a recess 90 and hole 92 therein to receive boss 88 and fastener 86, respectively.

The heat sink 84 has a portion 94 which extends from the main body of the heat sink inwardly with respect to the portion 24. When the heat sink 84 is assembled to the portion 24 as in FIG. 2, the portion 94 projects through the window or opening 80. A flat end surface 96 of portion 94 is located so that it intimately engages the surface of the transistors 78 as can be seen in FIG. 2. A compressible foam rubber or foam plastic seal member 98 is positioned between the surface 82 of midportion 32 and the heat sink 84. The seal member 98 has a rectangularly shaped opening 100 therethrough to allow the heat sink portion 94 to enter the interior 26 of the midportion 32. Seal 98 also has hole 102 therethrough to receive boss 88 of the midportion 32. When the heat sink 84 is drawn against the seal 98 by tightening of fastener 86, the heat sink surface 96 intimately engages the transistors 78. Also, the seal 98 is slightly compressed by the action of the fastener 86, the seal 98 effectively serves to prevent entry of contaminants into the transducer interior 26. When the heat sink is attached to member 24, extended edge portions 104 of the heat sink 84 are received into notches or recesses 106 formed in the sides of member 24. This interfitting of edge 104 and recess 106 accurately positions the heat sink 84 on the transducer.

Thus, by drawing the flat surface 96 of the heat sink 84 into intimate contact with the transistors 78, a maximum heat transfer occurs from the transistors to the heat sink and thus to atmosphere. To increase this heat transfer to atmosphere, a number of fins 108 are formed on the external surface of the heat sink 84. Preferably, the heat sink 84 is metal and thus these fins are easily formed by casting or molding.

An effective heat sink for the subject power transducer has been cast of either aluminum or zinc. The following table reveals data on the subject power transducer.

| SPECIFICATIONS | | |
| --- | --- | --- |
| Electrical: | | |
| | Supply Volt | 9–16 Vdc |
| | Signal Current | 0–650 mA |
| | Output Current | 10 A |
| Environmental: | | |
| | Amb. Oper. Temperature | −40 to 125° C. |
| | Media Oper. Temperature | −40 to 150° C. |

In testing of the subject power transducer without using a heat sink, a temperature rise of about 100 degrees C. per watt was experienced. The engine temperature environment is typically at about 125–150 degrees C. The junction temperature of the power transistor 78 will be destroyed above 175 degrees C. Thus, the operation of the transistor in an engine compartment can generate only so much heat to elevates its temperature no more than about 25 to 50 degrees C. Resultantly, without a heat transfer the transistor is limited to a power output of between 0.25 to 0.5 watts.

With the previously described heat sink, a temperature elevation over ambient of only about 18 degrees C per watt was measured. As before, operation of the transistor can produce heat in the range of 25 to 50 degrees C. With a heat sink, the limit of the transistor's operation is increased to about 1.4 to 2.8 watts. Although only one embodiment of the invention is illustrated and described in detail above, it is to be understood that the invention is defined by the following claims.

What is claimed is as follows:

1. An improved electronic transducer for sensing fluid pressure having at least one electronic power device and a heat sink therefore for generating a relatively large electrical output from a smaller electrical signal generated by a fluid pressure, comprising: hollow enclosure means; means for generating a small electrical signal in correspondence to a sensed pressure level of a fluid; at least one power device within the enclosure means for enhancing the small electrical signal and producing heat; window means in the transducer housing adjacent the power device; a heat sink device overlying the window means and having a projecting portion extending through the window means and into engagement with the power device whereby heat is transferred therefrom to the heat sink device and to atmosphere.

2. The transducer set forth in claim 1 and a circuit board in the enclosure and on which the power device is mounted; the window means and the power device being aligned and the projecting portion of the heat sink having a flattened end surface adapted to engage a similarly flattened surface of the power device.

3. The transducer set forth in claim 1 and including a compressible seal member which extends between the enclosure means and the heat sink; the seal member having an aperture therethrough configured to permit the projecting portion of the heat sink to extend therethrough.

4. The transducer set forth in claim 3 and a fastener means between the heat sink and the enclosure means to bring the heat sink into engagement with the power device and simultaneously draw the heat sink against the seal member thus sightly compressing the seal.

5. An improved electronic transducer for sensing fluid pressure and having at least one electronic power device and a heat sink therefore for generating a relatively large electrical output from a smaller electrical signal generated from a fluid pressure, comprising: a chip means for sensing fluid pressure and generating a relatively small electrical signal corresponding to the pressure level; enclosure means including a support for the chip means and define an interior space communicated with one side of the chip means; a circuit board in the enclosure space; at least one electronic power device on the circuit board for enhancing the small electrical signal and producing heat; the enclosure means defining a thin wall generally extending in close parallelism with the circuit board and further defining a windowed aperture in the wall which is aligned with the power device; a heat sink device extending over the thin wall and having a projecting portion extending through the windowed aperture and into engagement with the power device whereby heat is transferred to the heat sink and to atmosphere.

6. The transducer set forth in claim 5 and a circuit board in the enclosure and on which the power device is mounted; the window means and the power device being aligned and the projecting portion of the heat sink having a flattened end surface adapted to engage a similarly flattened surface of the power device.

7. The transducer set forth in claim 5 and including a compressible seal member which extends between the enclosure means and the heat sink; the seal member having an aperture therethrough configured to permit the projecting portion of the heat sink to extend therethrough.

8. The transducer set forth in claim 7 and a fastener means between the heat sink and the enclosure means to bring the heat sink into engagement with the power device and simultaneously draw the heat sink against the seal member thus sightly compressing the seal.

* * * * *